US 7,854,137 B2

(12) United States Patent
Lifson et al.

(10) Patent No.: US 7,854,137 B2
(45) Date of Patent: Dec. 21, 2010

(54) VARIABLE SPEED COMPRESSOR MOTOR CONTROL FOR LOW SPEED OPERATION

(75) Inventors: Alexander Lifson, Manlius, NY (US); Michael F. Taras, Fayetteville, NY (US)

(73) Assignee: Carrier Corporation, Farmington, CT (US)

( * ) Notice: Subject to any disclaimer, the term of this patent is extended or adjusted under 35 U.S.C. 154(b) by 501 days.

(21) Appl. No.: 11/916,488

(22) PCT Filed: Jun. 7, 2005

(86) PCT No.: PCT/US2005/020123

§ 371 (c)(1),
(2), (4) Date: Dec. 4, 2007

(87) PCT Pub. No.: WO2006/132638

PCT Pub. Date: Dec. 14, 2006

(65) Prior Publication Data

US 2008/0196445 A1    Aug. 21, 2008

(51) Int. Cl.
*F25B 31/00* (2006.01)
*F25B 49/00* (2006.01)

(52) U.S. Cl. .................................... 62/193; 62/228.4
(58) Field of Classification Search .............. 62/84, 62/192, 193, 228.1, 228.4, 228.5, 468; 417/44.1
See application file for complete search history.

(56) References Cited

U.S. PATENT DOCUMENTS

| | | | |
|---|---|---|---|
| 3,410,105 A | 11/1968 | Marsteller | |
| 5,067,326 A | 11/1991 | Alsenz | |
| 5,086,626 A | 2/1992 | Iida | |
| 5,123,080 A * | 6/1992 | Gillett et al. | 388/811 |
| 5,245,836 A | 9/1993 | Lorentzen et al. | |
| 5,255,529 A | 10/1993 | Powell et al. | |
| 5,490,394 A | 2/1996 | Marques et al. | |
| 5,568,732 A | 10/1996 | Isshiki et al. | |
| 5,613,369 A | 3/1997 | Sato et al. | |
| 5,657,638 A | 8/1997 | Erdman et al. | |

(Continued)

FOREIGN PATENT DOCUMENTS

JP    2004340542 A  *  12/2004

OTHER PUBLICATIONS

International Preliminary Report on Patentability dated Dec. 27, 2007.
Search Report PCT/US2005/020123.

*Primary Examiner*—Marc E Norman
(74) *Attorney, Agent, or Firm*—Carlson, Gaskey & Olds

(57) ABSTRACT

A variable speed drive is provided for a compressor in a refrigerant system. When a low load situation has been determined by the refrigerant system controls, the variable speed drive moves the compressor to a lower speed mode of operation. In this case, if a speed is so low that it cannot ensure adequate oil lubrication of the compressor elements, then the motor speed is periodically increased to a level that will ensure proper lubrication. In this manner, a variable speed drive compressor can be operated at an extremely low speed to precisely match load demand on a refrigerant system. The invention can be extended beyond refrigerant system applications and to any oil-lubricated compressors whose lubrication is speed dependant.

31 Claims, 2 Drawing Sheets

U.S. PATENT DOCUMENTS

| | | |
|---|---|---|
| 5,694,783 A | 12/1997 | Bartlett |
| 5,782,101 A | 7/1998 | Dennis |
| 5,797,276 A | 8/1998 | Howenstine et al. |
| 5,970,727 A | 10/1999 | Hiraoka et al. |
| 6,073,457 A | 6/2000 | Kampf et al. |
| 6,397,610 B1 | 6/2002 | Weng et al. |
| 6,415,617 B1 | 7/2002 | Seem |
| 6,560,980 B2 | 5/2003 | Gustafson et al. |
| 6,694,763 B2 | 2/2004 | Howard |
| 6,968,708 B2 | 11/2005 | Gopalnarayanan et al. |

\* cited by examiner

VARIABLE SPEED COMPRESSOR MOTOR CONTROL FOR LOW SPEED OPERATION

BACKGROUND OF THE INVENTION

This application relates to a control for a variable speed compressor motor, wherein the compressor may operate at extremely low average speeds for extended periods of time while still maintaining adequate lubrication.

Refrigerant systems are utilized in many applications to condition an environment. In particular, air conditioners and heat pumps are employed to cool and/or heat air entering an environment. The cooling or heating load of the environment may vary with ambient conditions, occupancy level, other changes in sensible and latent load demands, and as the temperature and/or humidity set points are adjusted by an occupant of the environment.

A feature that has been gaining popularity in improving the efficiency of refrigerant systems is the use of a variable speed drive for the compressor motor. Often, the compressor need not be operated at full speed, such as when the cooling load on the refrigerant system is relatively low. Under such circumstances, it might be desirable to reduce the compressor speed, and thus reduce the overall energy consumption of the refrigerant system. Implementation of a variable speed drive is one of the most efficient techniques to enhance system performance and reduce life-cycle cost of the equipment over a wide spectrum of operating environments and potential applications, especially at part-load conditions.

However, compelling reliability concerns set a lower limit to the desirable compressor speed reduction. In particular, inadequate lubrication of the compressor elements may present a problem at low operating speeds. This often occurs as the compressor oil delivery relies on an operation of a pump installed within the compressor, where the oil pump delivery head is strongly affected by the operating speed. If the compressor operating speed is reduced below a certain level, the oil pump cannot generate required pressure head to deliver the oil to the components that need to be lubricated within the compressor. This leads to the inadequate lubrication of those components and subsequent compressor damage. The internal components that are affected the most are the ones located farther away from the pump inlet. Thus, compressors are often rated with a minimum speed (typically 45 Hz) required to ensure adequate compressor lubrication. Even compressors that are specifically designed for variable speed operation, and incorporate special futures (such as a special oil pump) to promote lubrication, often cannot operate below 30 Hz. However, the minimum speed limit established by proper lubrication requirements may still need to be reduced well below 30 Hz to achieve efficient operation at part-load. That is, given the minimum speed limitations, much of the energy efficiency that could be potentially provided by the variable speed drive is essentially eliminated. Thus, there is a need to provide a compressor operating at a lower average speed than what can be currently achievable with current designs.

SUMMARY OF THE INVENTION

In the disclosed embodiment of this invention, a compressor is provided with a variable speed drive. When a low load is detected, the compressor is moved to a low speed to maintain adequate conditions in the environment without switching to a start-stop mode of operation. In fact, the compressor could be moved to a speed far below that was typically previously recommended as a minimum speed, due to reliability concerns. The compressor is allowed to operate at this low speed for a certain period of time. The compressor speed is periodically increased to a level that would ensure adequate lubrication of compressor elements. By periodically driving the compressor at a higher speed, the invention guarantees that an overall adequate supply of lubricant is provided to the compressor elements. The invention relies on residual oil that is left in the components that need to be lubricated during the time when the compressor operates at the low speed. The short bursts of high speed deliver the oil to the components that need to be lubricated. By allowing the compressor to operate at low speed and for short periods of time at high speed, the average compressor operating speed of the present invention can be far below the minimum speed established by the prior art techniques. In a preferred embodiment of this invention, pulse width modulation technique is utilized to vary the compressor motor speed.

Although, for illustrative purposes, this invention is described in relation to refrigerant systems incorporating scroll compressors, it could be applicable to any variable speed oil-lubricated compressor, whose oil delivery mechanism depends on compressor operating speed. These and other features of the present invention can be best understood from the following specification and drawings, the following of which is a brief description.

DETAILED DESCRIPTION OF THE PREFERRED EMBODIMENT

Figure 1:
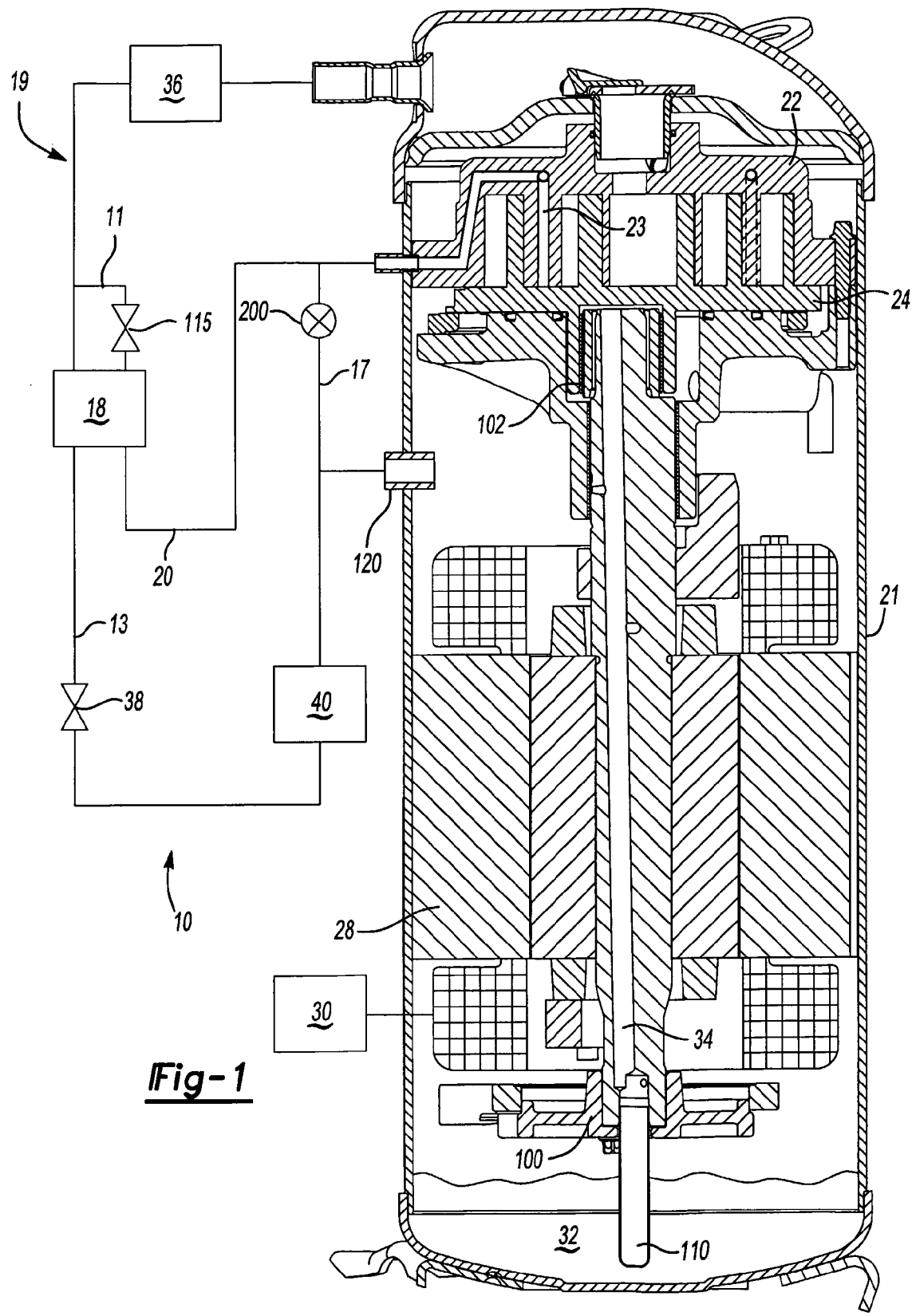
FIG. 1 is a schematic view of a refrigerant system incorporating the present invention.

A refrigerant system 19 is illustrated in FIG. 1 having a scroll compressor 21 incorporating a non-orbiting scroll member 22 and an orbiting scroll member 24. As is known, shaft 26 is driven by an electric motor 28 to cause the orbiting scroll member 24 to orbit. As shown, a variable speed drive 30 is schematically connected to drive the electric motor 28. An oil sump 32 and an oil passage 34 in the shaft 26 supply oil to the various moving elements in the compressor 21, as known.

A condenser 36 is positioned downstream of the compressor 21, an expansion device 38 is located downstream of the condenser 36, and an evaporator 40 is positioned downstream of the expansion device 38, as known. As is also known, the compressor 21 is driven by the electric motor 28 to compress the refrigerant vapor and to drive it through the refrigerant system 19. Oil from the oil sump 32 is delivered to the compressor elements to provide proper lubrication of the compressor components such as the crankcase bearing 100, orbiting scroll bearing 102, the fixed scroll 22 and the orbiting scroll 24, while some amount of oil leaves the compressor 21 with the refrigerant and is circulated through the refrigerant system 19. One of the most typical oil delivery systems of a scroll compressor is also shown in FIG. 1, where the oil from the oil sump 32 is picked up by the oil pick up tube 110, and delivered along the oil passage 34 to various compressor components as described above. Some of the oil can also be delivered through the suction port 120 by a refrigerant entering the compressor. However most of the oil delivery is accomplished by delivering the oil from the oil sump as described above. In the prior art, when a variable speed drive has been implemented in a refrigerant system, the designer has been limited by a minimum operational speed of the shaft 26 (the operational speed of the shaft is very close to the operational frequency) for the compressor 21. If the speed drops below a certain level for extended period of time, an insufficient amount of oil is delivered through the oil passage into the compressor components that need to be lubricated. Thus, for a low cooling load situation, where a small amount of the compressed refrigerant is needed to be circulated through the system, a minimum speed such as 45 Hz has often been a limiting factor in reducing the amount of the circulating refrigerant to the desired amount while at the same time ensuring adequate lubrication.

FIG. 1 shows additional features that may be incorporated into the refrigerant system 19. As an example, an economizer cycle is included and has an economizer heat exchanger 18. A main liquid line 13 has a tap line 11 tapped off of the main liquid line and passed through an economizer expansion device 115. The tap line 11 and the main liquid line 13 both pass through the economizer heat exchanger 18. In fact, and in practice, the refrigerant flow in the tap line is typically in the counterflow direction through the economizer heat exchanger in relation to the flow in the main liquid line 13. However, to simplify the illustration in this figure, they are shown in the same direction. As is known, the economizer circuit subcools the refrigerant in the main liquid line, and thus enhances performance (capacity and/or efficiency) of the refrigerant system 19. An economizer injection line 20 is shown extending back to the compressor 21, and injects an intermediate pressure refrigerant into compression chambers through passages such as passage 23. The function and structure of the economizer circuit is known, however, its inclusion with the inventive motor control 30 provides a refrigerant system that has even greater flexibility to enhance operation of the refrigerant system 19. An unloader line 17 includes an unloader valve 200. The unloader valve 200 is selectively opened to return partially compressed refrigerant from the compression chambers through the passages 23 back to a suction port 120 of the compressor 21. The unloader function presents a refrigerant system designer with an extra degree of freedom for performance adjustment and optimization.

Essentially, when a greater capacity is desired, the economizer function may be utilized with the unloader valve shut. Alternatively, if a lower capacity is necessary, the economizer expansion device 115 (or a separate shut-off device) is shut, with the unloader valve 200 opened. In this manner, the amount of compressed refrigerant delivered to the condenser 36 is reduced. Also, if desired to provide another intermediate stage of capacity for the refrigerant system 19, the economizer function can be combined with the unloader function by opening both the economizer expansion device 115 and the unloader valve 200.

These system configurations in combination with the variable speed motor control disclosed below provide greater freedom and flexibility to a refrigerant system designer.

It should be understood that the motor control 30 includes a program that takes in inputs from various locations within the refrigerant system, and determines when a lower speed for the compressor motor would be desirable.

A worker of ordinary skill in the art would recognize when a lower speed might be desirable and preferred in comparison to other available options.

Figure 2:
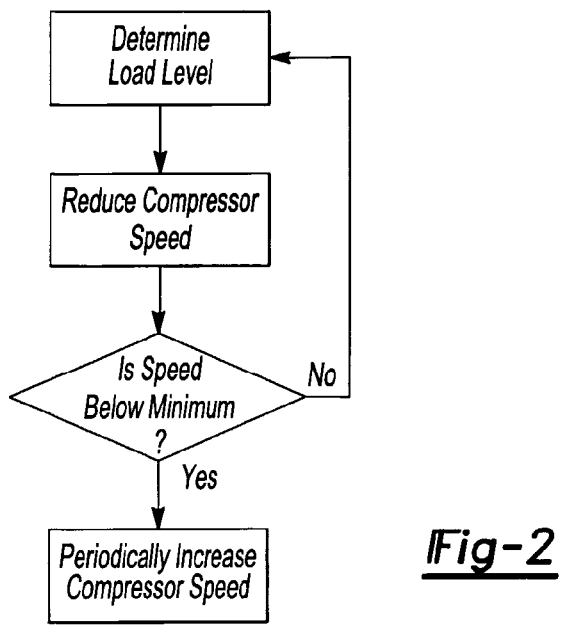
FIG. 2 is a brief flowchart of the present invention.

As shown in FIG. 2, the controls for the refrigerant system 19 determine the load demand on the refrigerant system 19, and if the load demand is low, the speed is reduced to an appropriate level. In the reduced compressor speed mode, if a very low speed (e.g. below 45 Hz) is utilized, then the speed is periodically increased (e.g. to the level above 45 Hz) to ensure that adequate lubrication is provided to the compressor elements.

Figure 3:
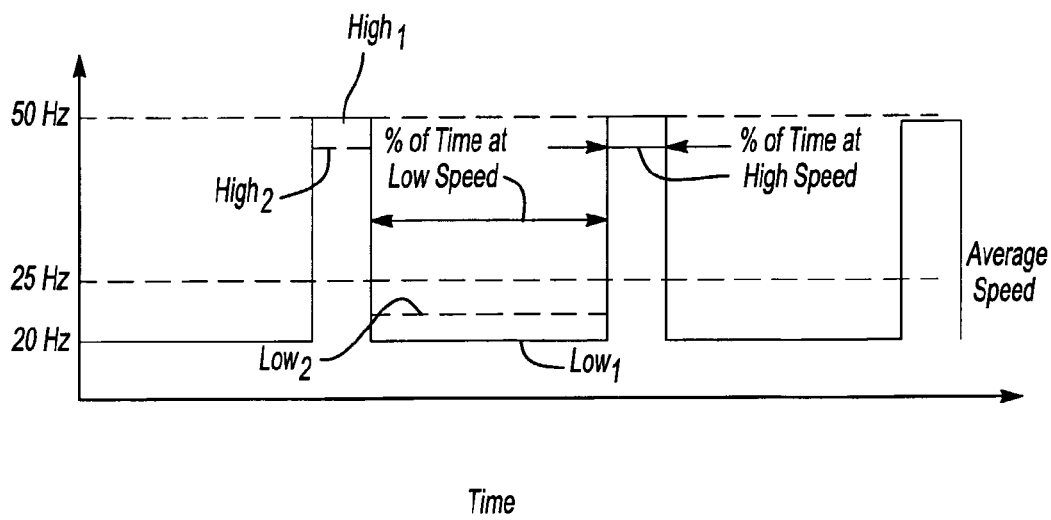
FIG. 3 is a graph showing the average speed according to the present invention.

As shown for example in FIG. 3, a pulse width modulation technique can be utilized to periodically increase the compressor speed up to the 50 Hz level from an otherwise low 20 Hz level. As shown in the embodiment of FIG. 3, this could result in an average speed of as low as 25 Hz, while still ensuring adequate lubrication of the compressor elements. Of course, the specific frequencies and modulation time intervals are examples only and would depend on the compressor design specifics. The main thrust of this invention is to allow compressor operation at significantly reduced speeds when a low load demand is imposed on the refrigerant system 19 and compressor 21. The compressor speed can be reduced far below the speed that would be otherwise necessary to ensure proper lubricant circulation, and then the compressor speed is increased periodically.

As can be appreciated, the average speed can be calculated as follows:

AVERAGE SPEED=LOW SPEED*(% OF TIME AT LOW SPEED)+High Speed*(% OF TIME AT LOW SPEED).

In examples, the lower speed is utilized for longer periods than is the higher speed. In the disclosed example, the 20 Hz speed might occur for 20 seconds with the 50 Hz speed only lasting for 5 seconds. Stated another way, the lower speed can be utilized for more than twice as long as the higher speed. Still, adequate lubrication is achieved. Once again, required modulation intervals, and maximum and minimum compressor speed may vary with the compressor design, required average operating speed, and system operating conditions.

As can also be appreciated from FIG. 3, there might be levels of high speed (high$_1$, high$_2$) and levels of lower speed (low$_1$, low$_2$) that may associated for instance with different operating conditions. Again, the program incorporated into the control 30 would be provided with these varying options. Once again, the various speeds can be selected based upon system considerations.

Figure 4:
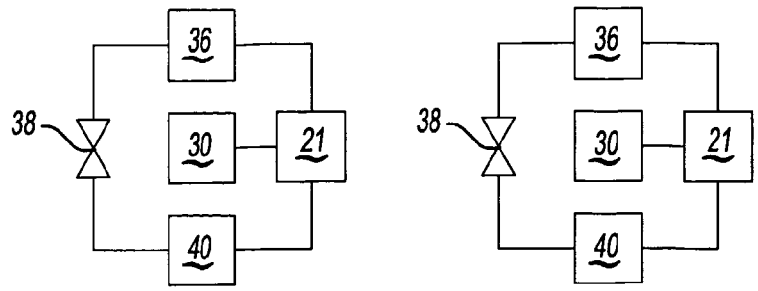
FIG. 4 shows another schematic of a refrigerant system.

FIG. 4 shows another schematic wherein there are multiple independent refrigerant circuits within a refrigerant system each including a compressor 21, condenser 36, expansion device 38 and evaporator 40. The motors for the compressors 21 are provided with variable speed drives 30. Although these two circuits are shown in a simplified manner, it should be understood that various additional elements such as the economizer and unloader functions can be incorporated into these systems. Obviously enough, the refrigerant system may incorporate more than two independent circuits, and not necessarily each compressor may be provided with a variable speed drive.

It has to be understood that although this invention is described in relation to the refrigerant systems incorporating scroll compressors, it could be applicable to any variable speed oil-lubricated compressor that utilizes an oil delivery mechanism that is operating speed dependant.

Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A refrigerant system comprising:
a compressor and an electric motor for driving said compressor, a variable speed drive for varying a speed of operation of said electric motor;
a condenser downstream of said compressor, an expansion device downstream of said condenser, and an evaporator downstream of said expansion device; and
said variable speed drive moving said compressor to low speed operation, and said variable speed drive being operable for entering a low speed mode should a speed of said compressor drop below a predetermined minimum, and said variable speed drive operating said compressor at low level of speed, and then periodically increasing the speed of said compressor toward a higher level of speed, with said higher level of speed being selected to ensure adequate lubrication of the compressor elements when in said low speed mode.

2. The refrigerant system as set forth in claim 1, wherein said variable speed drive is provided with a program to determine when said compressor needs to operate at said low speed.

3. The refrigerant system as set forth in claim 1, wherein said variable speed drive is provided with a pulse width modulation control to periodically drive the compressor at said higher level of speed.

4. The refrigerant system as set forth in claim 1, wherein said compressor is selected from the group consisting of a scroll compressor, a rotary compressor, a reciprocating compressor, and a screw compressor.

5. The refrigerant system as set forth in claim 1, wherein a shaft for driving the compressor has a lubrication passage, and lubricant moves from a sump in a compressor housing upwardly through said lubrication passage to components of said compressor.

6. The refrigerant system as set forth in claim 1, wherein said variable speed drive drives said compressor at said low level of speed for a longer period of time than driving said compressor at said higher level of speed.

7. The refrigerant system as set forth in claim 6, wherein said low level of speed is utilized for more than twice as long as said higher level of speed.

8. The refrigerant system as set forth in claim 1, wherein the refrigerant system includes a plurality of circuits, with at least one of said circuits having a variable speed drive for controlling said compressor as, set forth.

9. The refrigerant system as set, forth in claim 1, wherein an economizer circuit is incorporated into the refrigerant system.

10. The refrigerant system as set forth in claim 1, wherein said compressor is provided with an unloader circuit.

11. The refrigerant system as set forth in claim 1, wherein the refrigerant system is provided with both an economizer circuit and an unloader circuit.

12. The refrigerant system as set forth in claim 1, wherein said higher level of speed can be varied dependent on refrigerant system operating conditions.

13. The refrigerant system as set forth in claim 1, wherein said low level of speed can be varied dependent on refrigerant system operating conditions.

14. The refrigerant system as set forth in claim 1, wherein said higher level of speed includes a plurality of levels of speed that can be selected.

15. The refrigerant system as set forth in claim 1, wherein said low level of speed includes a plurality of levels of speed that can be selected.

16. A compressor comprising:
a compressor pump unit and an electric motor for driving said compressor pump unit, said electric motor being provided with a variable speed drive; and
entering a low speed mode should a speed of said compressor pump unit drop below a predetermined minimum, said variable speed drive moving said compressor to low speed operation, and said variable speed drive operating said compressor at a low level of speed, and then periodically increasing the speed of said compressor toward a higher level of speed, with said second higher level of speed being selected to ensure adequate lubrication of the compressor elements when in said low speed mode.

17. The compressor as set forth in claim 16, wherein said variable speed drive is provided with a pulse width modulation control to periodically drive the compressor at the said higher level of speed.

18. The compressor as set forth in claim 16, wherein said compressor is selected from the group consisting of a scroll compressor, a rotary compressor, a reciprocating compressor, and a screw compressor.

19. The compressor as set forth in claim 16, wherein a shaft for driving the compressor has a lubrication passage, and lubricant moves from a sump in a compressor housing upwardly through said lubrication passage to components of said compressor.

20. The compressor as set forth in claim 16, wherein said variable speed drive drives said compressor at said low level of speed for a longer period of time than driving said compressor at said higher level of speed.

21. The compressor as set forth in claim 20, wherein said low level of speed is utilized for more than twice as long as said higher level of speed.

22. The compressor as set forth in claim 16, wherein an economizer injection port extends into the compressor.

23. The compressor as set forth in claim 16, wherein said compressor is provided with an unloader circuit.

24. The compressor as set forth in claim 16, wherein the compressor is provided with both an economizer injection port and an unloader circuit.

25. The compressor as set forth in claim 16, wherein said higher level of speed can be varied dependent on refrigerant system operating conditions.

26. The compressor as set forth in claim 16, wherein said low level of speed can be varied dependent on refrigerant system operating conditions.

27. The compressor as set forth in claim 16, wherein said higher level of speed includes a plurality of levels of speed that can be selected.

28. The compressor as set forth in claim 16, wherein said low level of speed includes a plurality of levels of speed that can be selected.

29. A method of operating a refrigerant system comprising the steps of:
(1) providing a compressor with a variable speed drive, and monitoring a load on a refrigerant system associated with said compressor;
(2) identifying a low load situation, and moving said compressor to a low speed operation when a low load situation has been identified; and
(3) operating said compressor at a low level of speed, entering a low speed operation mode should a speed of said compressor drop below a predetermined minimum, and periodically moving said compressor speed upwardly to a higher level of speed with said higher level of speed being selected to ensure adequate lubrication of compressor elements while in said low speed mode.

30. The method as set forth in claim 29, wherein said low level of speed is utilized for a longer period of time than said higher level of speed.

31. The method as set forth in claim 30, wherein said low level of speed is utilized for more than twice as much time as said higher level of speed.

* * * * *